May 30, 1967
C. C. BROWN
3,322,443
QUICK COUPLING DEVICE FOR TUBULAR BODIES
Filed April 17, 1964
2 Sheets-Sheet 1
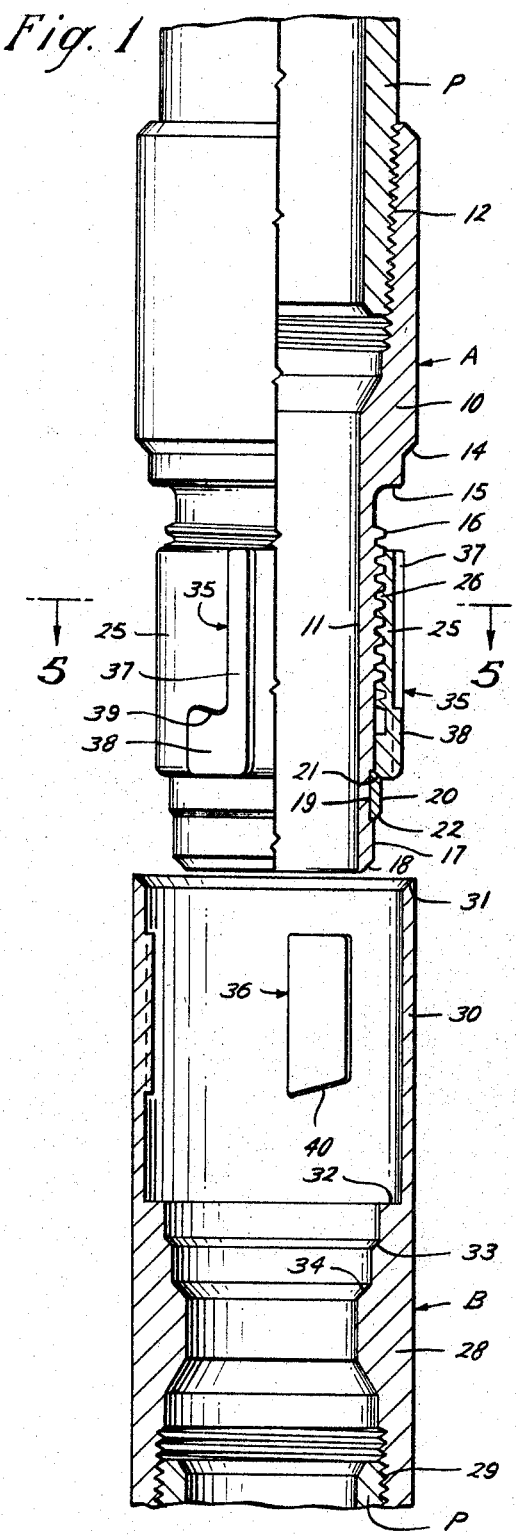
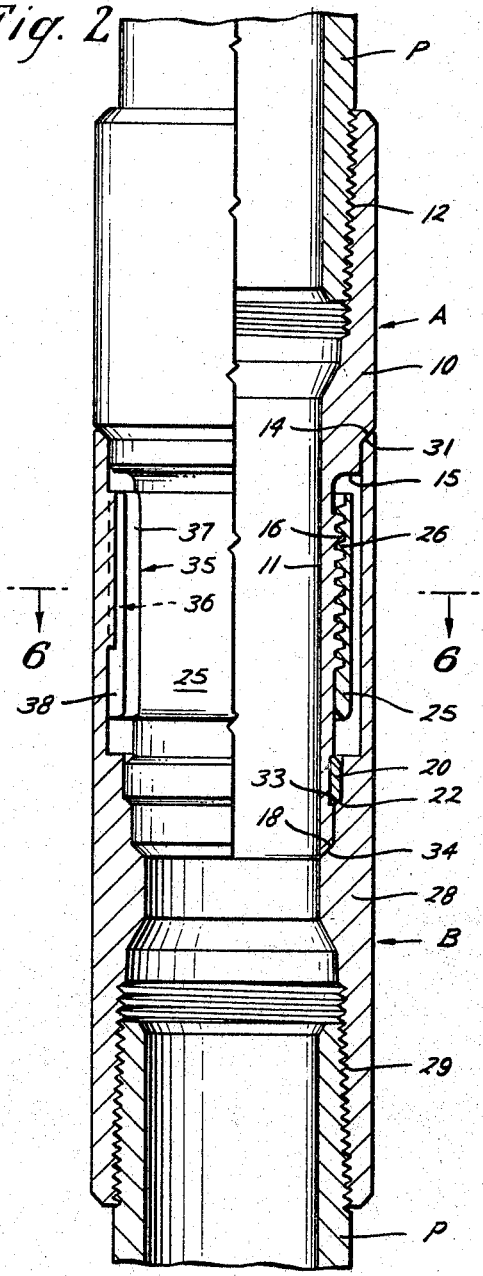
INVENTOR.
Cicero C. Brown
BY
ATTORNEY

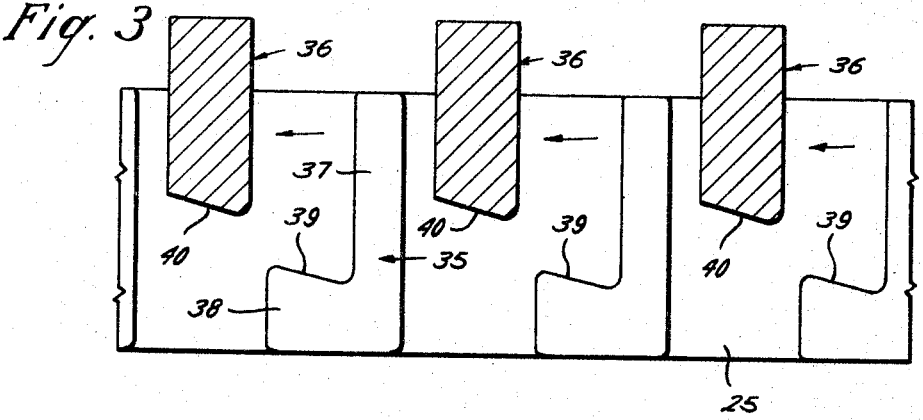
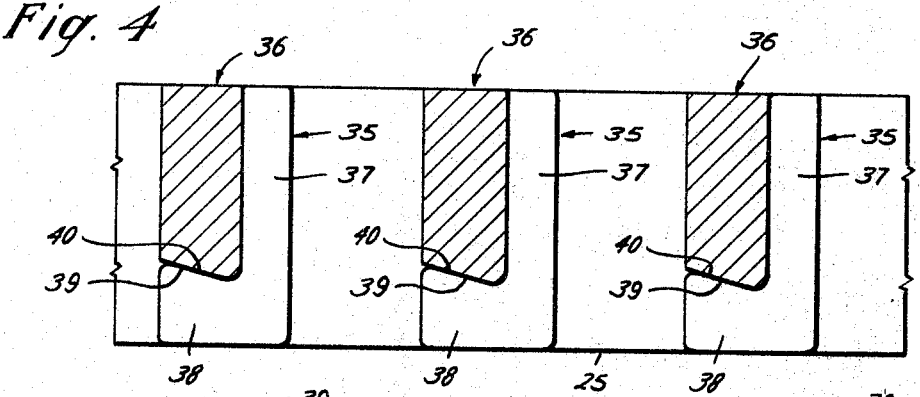
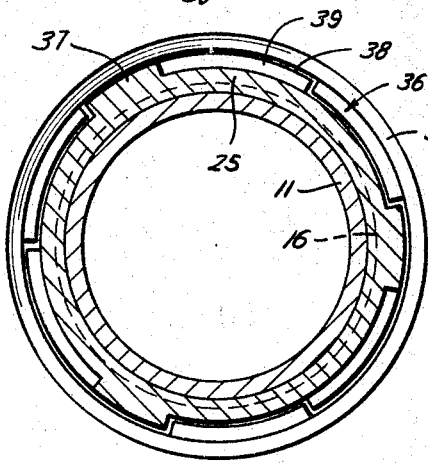
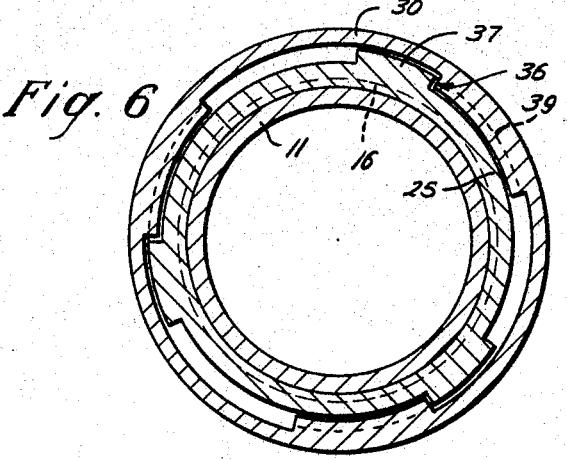
INVENTOR.
Cicero C. Brown
BY
ATTORNEY

United States Patent Office 3,322,443
Patented May 30, 1967

3,322,443
QUICK COUPLING DEVICE FOR TUBULAR BODIES
Cicero C. Brown, c/o Brown Oil Tools, Inc., P.O. Box 19236, Houston, Tex. 77024
Filed Apr. 17, 1964, Ser. No. 360,612
6 Claims. (Cl. 285—332)

This invention relates to coupling devices for connecting tubular bodies and more particularly to a coupling device for effecting rapid connection and disconnection between tubular bodies.

Tubular bodies such as ordinary pipe sections, are commonly connected together by means of threaded collars or couplings which employ thread sections requiring a plurality of complete relative rotations between the pipe section and the collar to effect a connection of adequate tightness. Various forms of threads, such as V-threads or truncated shapes such as the Acme-type threads or variations thereof may be employed.

In many instances, it is desirable to employ pipe strings, for example, in oil and gas wells, which must be made-up or broken-out very rapidly. This is particularly true in the case of pipe strings employed for inserting and removing various types of tools which must be operated in a well bore for various purposes.

The present invention is directed to an improved form of coupling by means of which pipe sections may be made-up or broken-out very quickly and which, when made-up, will effect tight metal-to-metal seals between the members of the coupling.

The coupling, in accordance with this invention, may be used with tubing strings or other well pipe strings, such as drill pipe, and may also be employed as safety joints in such pipe strings.

An important object of this invention is to provide a quick coupling device for tubular bodies which may also be effectively fully made-up to provide a tight metal-to-metal seal, with relative rotation between the members of very few turns, ranging from less than one full turn to generally not more than about two full turns.

Other and more specific objects and advantages of this invention will become more readily apparent from the following detailed description when read in conjunction with the accompanying drawing which illustrates one useful embodiment in accordance with this invention.

In the drawing:

FIG. 1 is a longitudinal, quarter-sectional view of a coupling device in accordance with this invention, showing the parts in the positions occupied immediately prior to engagement of the coupling members;

FIG. 2 is a view similar to FIG. 1, showing the coupling in fully made-up position;

FIG. 3 is a development of cam elements employed in effecting engagement of the coupling members, the co-operating cam elements being shown at a stage immediately preceding engagement;

FIG. 4 is a view similar to FIG. 3, showing the cam elements in fully made-up relation;

FIG. 5 is a quarter-sectional view taken generally along line 5—5 of FIG. 1; and FIG. 6 is a cross-sectional view taken generally along line 6—6 of FIG. 2.

Referring to the drawing, the coupling, in accordance with this invention, comprises a male member, designated generally by the letter A, and a female member, designated generally by the letter B. Male member A includes a tubular body portion 10 and a reduced diameter pin portion 11. The rearward end of a body 10 is provided with an internally threaded socket or box 12 for threaded reception of the end of a tubular body, such as a section of pipe P. The reduction in diameter of body 10 to define pin portion 11 is made in two steps, the outermost defining the sloping annular land or shoulder 14 and a second or intermediate annular land or shoulder 15. Beginning a short distance forwardly of intermediate shoulder 15, pin portion 11 is provided with a section of external threads 16 of a generally coarse, fast lead or pitch type, such as conventional Acme or modified Acme threads, which, for example, may be dimensioned to run about two threads per inch. A section of from about 8 to 10 threads will ordinarily be provided. Extending forwardly from the outer-most one of the threads 16 is an unthreaded or smooth surface section 17 terminating in a bevelled end face 18 on the forward end of pin portion 11. Section 17 is interrupted at a point intermediate threads 16 and end face 18 by an annular groove 19 adapted to receive a conventional snap ring 20 dimensioned to project outwardly from groove 19 to form upper and lower shoulders or abutments 21 and 22, respectively.

Mounted about pin portion 11 and threadably connected to threads 16 is a generally cylindrical sleeve nut 25 having a section of internal threads 26 complementary to threads 16. The outer or forward end of sleeve nut 25 is adapted to abut shoulder 21 to limit forward or outward movement of the sleeve nut on pin portion 11, while the inner or rearward end of the sleeve nut is adapted to abut intermediate shoulder 15 to limit its inward or rearward movement relative to the pin portion. Thus, relative longitudinal movement of the sleeve nut on pin portion 11 is limited in one direction by shoulder 21 and in the other by shoulder 15, the total extent of movement being limited generally to a distance corresponding to only a few turns on threads 16.

Female member B includes a tubular body 28 having at its outer or rearward end an internally threaded socket or box 29 for attachment to an adjacent tubular body, such as another section of pipe P. At its forward end female member B incudes a smooth-walled tubular socket portion 30 terminating at its outer end in a bevelled annular end face 31, socket 30 being dimensioned to telescopically receive the pin portion of male member A. The wall thickness of socket 30 is preferably made such that when the coupling members are fully connected, socket member 30 will slide smoothly over the first reduced diameter portion of body 10 of the pin member which joins shoulders 14 and 15, while end face 31 will engage the bevelled surface of land 14 on body 10 of the pin member. The external diameters of body 10 of the pin member and body 28 of the female member will be the same, so as to provide a flush connection.

The diameter of the bore of socket 30 is reduced in two steps beginning with the bottom 32 of the socket, the first reduction defining the bevelled annular shoulder or land 33, and the second reduction defining the annular shoulder or land 34. The latter is adapted to be engaged by bevelled end surface 18 of the pin portion when the coupling members are made-up and at the same time, shoulder 22 of the snap ring is adapted to engage land 33 in the female member.

Nut 25 and socket 30 carry co-operating cam elements, respectively designated generally by the numerals 35 and 36. Cam element 35 is generally of a reverse J- or L-shape comprising a vertical leg 37 extending substantially the full length of sleeve nut 25 and a horizontal leg 38 extending generally horizontally in the clockwise direction around the exterior of sleeve nut 25 for an angular distance of any suitable length. Horizontal leg 38 is provided with an inner (upper in the figures) cam surface 39 which slopes from the outer end of leg 38 downwardly and inwardly toward its juncture with vertical leg 37.

Socket member 30 carries co-operating cam elements 36 which are generally rectangular in shape, except for a lower end face 40 having a slope generally complementary to that of cam surface 39.

Sleeve nut 25 and socket 30 may be provided with one or more sets of such complementary co-operating cam elements, which may be as few as one set to as many as four or even more, depending upon the spacing desired between the sets of cam elements, the areas of the engaging surfaces of the cam elements required in order to provide the necessary shear strength in the coupling, and other design factors which will be well understood by those skilled in the art. In the illustrative embodiment, three sets of cam elements are shown disposed on 120° centers. It will be understood that the external diameter of sleeve nut 25, as defined by a circle enclosing cam elements 35, will be such as to have a relatively close sliding fit in the bore of socket 30, the spaces between the cam elements on each of the members being such as to permit the cam elements on one of the parts to move longitudinally past the cam elements on the other when pin portion 11 is inserted into or withdrawn from, socket 30. Moreover, the longitudinal positions of cam elements 36 in socket 30 will be such as to allow horizontal legs 38 of cam elements 35 to move below cam surfaces 40 during the making and breaking of the coupling connection.

It will also be understood that while the illustrative embodiment shows cam elements 35 to be located on the exterior of sleeve nut 25 and cam elements 36 projecting from the bore wall of socket 30, the location of these elements on the sleeve nut and socket wall may be reversed, in which case cam elements 35 and 36 will be inverted from the positions shown in FIG. 1. The functioning of the connection will be unchanged.

Operation of the coupling is conducted as follows: Male and female members A and B will be connected to the adjacent ends of pipe sections P which are to be coupled together. Sleeve nut 25 will be mounted on threads 16 and run down on the threads to engage with upper shoulder 21 of snap ring 20. The pin member will be inserted into socket 30, being turned, if necessary, sufficiently to align cam elements 35 with the spaces between cam elements 36, so as to allow pin portion 11 to be moved axially into the bottom of socket 30. The relative positions of the cam elements at this early stage of operations is illustrated in FIG. 3. At this stage of operations, end face 18 on the end of the pin portion will have engaged land 34 in the socket and lower end 22 of snap ring 20 will have engaged land 33, thereby limiting further inward movement of the pin portion into the socket. An initial right-hand rotation of male member A will now be effected, bringing vertical legs 37 of the cam elements carried by the sleeve nut, into lateral engagement with the opposed longitudinal edges of cam elements 36, thereby stopping further rotation of the sleeve nut relative to the socket, this movement being indicated by the direction of the arrows in FIG. 3. At the moment of engagement of these surfaces, lower end surface 40 of the cam elements 36 will be spaced longitudinally a short distance from cam surfaces 39. Continued right-hand rotation of male member A will now produce relative rotation between pin portion 11 and sleeve nut 25, since the latter is held against rotation relative to socket 30 by the engagement of vertical legs 37 with the opposed edges of cam elements 36. This continued rotation of male member A will then cause upward movement of sleeve nut 25 on pin portion 11 until cam surfaces 39 engage surfaces 40 and continued rotation of the pin portion relative to sleeve nut 25 will cause cam surfaces 39 to move angularly and upwardly along surface 40 until these surfaces become fully engaged. The reaction of the thus engaged surfaces will, under the force imposed by the rotation, act through the cam elements to urge the coupling members axially toward each other, thereby tightening the joint formed by the coupling.

By the use of relatively coarse, fast lead threads 16 and the selection of an appropriate angle for surfaces 39 and 40, tight connection can be effected with less than a full rotation of member A relative to member B. By continued application of torsional force to member A, end section 17 of pin portion 11 will be forced to undergo a sufficient amount of annular deflection to allow additional relative axial movement between the coupling members to move end face 31 of socket 30 into tight engagement with bevelled land 14 on male member A, thus providing metal-to-metal sealing between land 14 and end face 31 and between end faces 18 and land 34. In practice, very little additional rotation between the coupling members is required to result in this terminal metal-to-metal sealing engagement. A practical arrangement to accomplish this is obtained by making the longitudinal length of pin portion 11 from land 14 to end face 18 slightly greater than the longitudinal dimension between end face 31 and land 34 of the socket portion of female member B. The difference in these dimensions may conveniently be about .005 of an inch.

Release of the coupling may be effected very quickly simply by reverse relative rotation between coupling members A and B. The first movement will be an unscrewing of pin portion 11 from sleeve nut 25 through an extent of angular rotation sufficient to move cam elements 35 out of alignment with cam elements 36. The extent of relative rotation necessary to accomplish this will be approximately the same as required to make-up the joint, to wit, from less than one full rotation to not more than about two rotations, depending, as noted previously, upon the slope of cam surfaces 39 and 40, the pitch of threads 16 and the angular length of horizontal legs 38. In the illustrative embodiment a thread section of two threads per inch and a slope of 15° for cam surfaces 39 and 40 are employed. Once the cam elements are disengaged, the coupling members can be readily pulled apart.

From the foregoing, it will be seen that there is herein described a coupling device which can be made-up and broken very quickly by a minimum amount of relative rotation, and which may, by a slight extension of the make-up rotation, effect both internal and external metal-to-metal sealing between the coupling members.

By requiring the use of only one or two threads in making-up and breaking-out the coupling, the structure is subjected to a very minimum amount of wear, so that the couplings may be used repeatedly.

It will be understood that various changes and modifications may be made in the details of the illustrative embodiment within the scope of the appended claims but without departing from the spirit of this invention.

What I claim and desire to secure by Letters Patent is:

1. A quick coupling device for tubular bodies, comprising, a male member having a pin portion, a female member having a tubular socket for telescopically receiving said pin portion, a section of threads on said pin portion, a nut threadably disposed about said thread section and insertible therewith entirely within said socket, cooperating cam elements carried on the exterior of said nut and on the interior of said socket initially engageable to stop relative rotation between said nut and said female member, said cam elements having inter-engaging cam surfaces shaped to urge said members axially toward each other in response to relative rotation between said male member and said nut after initial engagement of said cam elements, and annular shoulder means carried by said members in longitudinally spaced relation to their respective end faces, said shoulder means being engageable by the related annular end faces of the respective members in response to said last-mentioned relative rotation whereby to provide metal-to-metal sealing between said shoulders and the respective end faces on opposite sides of said nut.

2. A quick coupling device for tubular bodies, comprising, a male member having a pin portion, a female member having a tubular socket for telescopically receiving said pin portion, a section of threads on said pin portion, a nut threadably disposed about said thread section, a plurality of angularly spaced sets of cooperating cam elements projecting from the exterior of said nut and from the inner wall of said socket initially engageable to stop relative rotation between said nut and said female member, said sets of cam elements having inter-engaging cam surfaces shaped to urge said members axially toward each other in response to relative rotation between said male member and said nut after initial engagement of said cam elements, external annular shoulder means on the male member about the base of the pin portion, and internal annular shoulder means in the bottom of said socket respectively engageable by the annular end faces of said female member and said pin portion in response to said last-mentioned relative rotation whereby to provide metal-to-metal sealing between said shoulders and the respective end faces.

3. A coupling device according to claim 2 wherein each of said members carries means for connecting it to a tubular body.

4. A coupling device according to claim 2 wherein said threads are of the coarse fast-lead type.

5. A quick coupling device for tubular bodies, comprising, a male member having a reduced diameter pin portion defining an annular shoulder about the base of said pin portion, a female member having a substantially smooth-walled tubular socket for telescopically receiving said pin portion, the outer end of said socket defining an annular surface adapted to sealingly engage said annular shoulder when said members are fully engaged, a section of threads on said pin portion intermediate its ends, a sleeve nut threadably disposed about said thread section and insertible therewith entirely within said socket, abutment means on the pin portion longitudinally spaced from the ends of said thread section to limit the extent of relative longitudinal movement in both directions between said sleeve nut and said pin portion, cooperating cam elements projecting radially from the exterior of said nut and from the inner wall of said socket initially engageable to stop relative rotation between said nut and said female member, said cam elements having inter-engaging cam surfaces shaped to urge said members axially toward each other in response to relative rotation between said male member and said nut after said initial engagement of said cam elements, the bottom of said socket member having an annular sealing shoulder, and the outer end of said pin portion defining an annular surface adapted to sealingly engage said sealing shoulder when said members are fully engaged, the relative longitudinal dimensions of said pin portion and said socket member being such as to provide internal and external metal-to-metal seals between said coupling members on opposite sides of said sleeve nut.

6. A quick coupling device according to claim 5 wherein the longitudinal dimension of said pin portion from its end surface to said annular shoulder is made slightly greater than that of said socket from said sealing shoulder to said annular surface, whereby the end surface of said pin portion will engage said sealing shoulder slightly in advance of the engagement of said outer end of said socket with said annular shoulder in response to said rotation of the pin portion relative to said nut after said initial engagement and thereby produce deflection of the end of said pin portion sufficient to cause the outer end of said socket to move into said sealing engagement with said annular shoulder.

References Cited

UNITED STATES PATENTS

| | | | |
|---|---|---|---|
| 193,810 | 8/1877 | Eccleston | 285—377 |
| 542,364 | 7/1895 | Kopp | 285—376 |
| 1,229,079 | 6/1917 | Hill | 285—396 |
| 2,367,458 | 1/1945 | Coplen | 285—361 |
| 3,061,336 | 10/1962 | Waggener | 285—362 |
| 3,097,001 | 7/1963 | Le Bus | 285—361 |
| 3,153,547 | 10/1964 | Chancellor et al. | 285—18 |

CARL W. TOMLIN, *Primary Examiner.*

MARION PARSONS, Jr., THOMAS F. CALLAGHAN,
*Examiners.*